United States Patent [19]

Varrasso et al.

[11] Patent Number: 4,780,120
[45] Date of Patent: Oct. 25, 1988

[54] BUSHING BALANCE CONTROLLER AND METHOD OF USING SAME

[75] Inventors: Eugene C. Varrasso, Heath; Glen F. Day, Gambier; Avinash J. Desai, Reynoldsburg, all of Ohio

[73] Assignee: Owens-Corning Fiberglas Corporation, Toledo, Ohio

[21] Appl. No.: 70,745

[22] Filed: Jul. 6, 1987

[51] Int. Cl.$^4$ ............................................. C03B 5/027
[52] U.S. Cl. ............................................. 65/29; 65/1; 65/162; 65/DIG. 4; 373/28; 373/40
[58] Field of Search ....................... 65/1, 29, 160, 162, 65/DIG. 4; 373/28, 40

[56] References Cited

U.S. PATENT DOCUMENTS 4,515,614  5/1985  Barkhau et al. ................... 65/29
4,704,150  11/1987  McEarthron ....................... 65/1

Primary Examiner—Robert L. Lindsay
Attorney, Agent, or Firm—Patrick P. Pacella; Ronald E. Champion

[57] ABSTRACT

A bushing balance controller senses the temperature of each section of a multiple section glass fiber forming bushing by thermocouples or resistance (voltage drop) measuring techniques and injects electrical energy to all but one of the individual bushing sections and adjusts the supply of electrical energy to the entire bushing assembly thereby controlling the temperature of each individual section of the bushing. When thermocouples sensors are utilized, standard thermocouple driven temperature controllers may be utilized to provide a signal to a plurality of power packs, a primary power pack providing electrical energy to the entire bushing and smaller power packs controlling the injection of electrical energy to all but one of the bushing segments. A similar power pack and bushing control scheme accompanies the use of resistance (voltage drop) measurement techniques. Here, however, the control signal is generated by an error signal representative of the present, sensed temperature versue the set point temperature. In order to eliminate the interference between the voltage drop sensing and the injected current, an interleaving technique is utilized to sense voltage drop and inject electrical energy during alternate cycles of the applied power.

14 Claims, 3 Drawing Sheets

BUSHING BALANCE CONTROLLER AND METHOD OF USING SAME

TECHNICAL FIELD

The Bushing Balance Controller relates to glass fiber production arts and specifically to an apparatus and method for balancing and maintaining the temperature across each section of a multiple section glass fiber producing bushing.

BACKGROUND OF THE INVENTION

One method of producing glass fibers is to pass molten glass through openings in a precious metal bushing and attenuate the resulting molten streams of glass into fibers. The metal bushing forms a container which is filled with molten glass. The bottom of the bushing defines a plurality of apertures through which the molten glass is drawn by mechanical means. It is advantageous to heat the bushing to a uniform temperature in order to facilitate and ensure the production of uniform glass fibers. A preferable method of heating the bushing is to pass a high electrical current through it.

The diameter of the fibers produced is dependent upon the composition of the glass, the temperature of the glass, the temperature of the bushing, the thermal conditions below the bushing which affect the rate of cooling of the molten glass fibers and the stress introduced into the fibers by mechanical attenuation thereof. The object of the process is to produce a plurality of glass fibers of uniform diameter which in turn produce uniform package weights. Commonly, bushings having multiple sections are utilized and the maintenance of constant and uniform temperature across each section of such a multiple section bushing has been found to be an important consideration in the production of uniform fiber diameters.

Various schemes have been suggested for controlling the application of heat to individual sections of a multiple section bushing in order that each section operate constantly at a common temperature. For example, U.S. patent application Ser. No. 839,676, filed Mar. 14, 1986, now U.S. Pat. No. 4,657,572 granted Apr. 14, 1987 and owned by the assignee herein balances temperature in a multiple section bushing by diverting current flow from a bushing section which is operating at a temperature above the set point in order to achieve and maintain the set point temperature. In this system, temperature sensing of the individual bushing sections is achieved by sensing the resistance change of the bushing sections and calculating the temperature and temperature deviation from the set point.

Another means of temperature sensing is disclosed in U.S. Pat. No. 4,594,087. Here, a plurality of thermocouples are positioned in various locations along a bushing and thus provide an average temperature reading. A pair of thyristors controllably shunt current flow through each half of the bushing to maintain the desired temperature.

U.S. Pat. No. 4,024,336 discloses a split bushing controller somewhat similar to the above-noted apparatus. Here, two temperature sensing components are utilized. The first drives a first controller which regulates the power supplied to the entire bushing whereas the second temperature sensor and a second controller regulate the relative current to the two bushing sections by controlling a pair of full wave variable impedance devices shunting the bushing halves.

In U.S. Pat. No. 4,546,485, a plurality of thermocouples disposed along a bushing provide an average temperature which is utilized to control and maintain the current flow and thus temperature of the bushing. A manually adjustable variable impedance device may be adjusted to control the relative temperatures of the halves of the bushing in order to achieve and maintain equal throughput.

One of the first considerations to be faced in any glass fiber bushing temperature controller device is the choice of temperature sensing means. Those generally recognized as having utility in this application are thermocouples, infrared, i.e., non-contact temperature measurement and resistance measurement.

Each of the foregoing temperature measurement means is accompanied by advantages and disadvantages. For example, present thermocouple technology provides extremely accurate temperature measurement. However, at the operating temperature of glass fiber forming bushings, that is, around 2,500° Fahrenheit, thermocouples have a relatively short life. Furthermore, they measure temperature only at one point and since they are generally secured to the outside of the bushing, a finite time lag exists between a change in temperature of the molten glass and a change in bushing temperature and the sensing of same by the thermocouple. Infrared temperature measurement techniques though accurate have been frustrated by the presence of the issuing streams of molten glass and the crowded conditions beneath the bushing due to fin shields and other temperature control devices.

Temperature sensing and control through resistance measurement is perhaps the approach best suited to this application but it too is not without obstacles. For example, since the system senses the resistance of the bushing while current is flowing through it, the system is susceptible to noise in the power line and other locally generated interference. Furthermore, presuming the control system adjusts the current flowing through portions of the total bushing, steps must be taken to prevent the adjusted current flows from interfering with the resistance reading.

It is apparent from the foregoing description and discussion of the prior art that improvements in the art of temperature control of multiple section glass forming bushings are not only desirable but possible.

SUMMARY OF THE INVENTION

A bushing balance controller according to the present invention senses the temperature of each section of a multiple section glass fiber forming bushing by thermocouples or resistance (voltage drop) measuring techniques and adjusts the electrical energy supplied to and passing through the entire bushing and the electrical energy injected into all but one individual section of the bushing to maintain each bushing section at a desired set point temperature.

In a system utilizing N thermocouples attached to N bushing sections, N-1 thermocouple controllers and power supplies inject power to control the N-1 sections while the Nth thermocouple, controller and power supply controls the application of electrical energy and thus the temperature of the entire bushing of N sections, thereby effectively controlling the temperature of the Nth bushing section.

Resistance (voltage drop) measurement techniques may also be utilized to control, in a similar fashion, the temperature of N individual sections of a multiple section bushing by sensing the voltage drop across each of N sections and controlling the injection of electrical energy in each of N−1 sections in accordance with a sensed deviation from set point and sensing the voltage drop across the Nth section and controlling the application of electrical energy to the entire bushing of N sections in accordance with a sensed deviation from set point, thereby effectively controlling the temperature of the Nth bushing section. In this arrangement, current is injected in the N−1 sections and voltage drop is sensed during alternate power supply cycles to ensure accurate sensing and proper control.

Thus it is an object of the present invention to provide a bushing balance controller for adjusting and maintaining the temperature of each individual section of a multiple section glass fiber forming bushing.

It is a further object of the present invention to provide a means for sensing the temperature of individual sections of a multiple section glass fiber forming bushing and injecting supplemental electrical energy into all but one bushing section to adjust and maintain the temperature of each section of the bushing at a desired set point.

It is a still further object of the present invention to provide a multiple section glass forming bushing controller which senses the temperature of N bushing sections and controls the injection of electrical energy into N−1 sections and the flow of electrical energy through all N sections.

Further objects and advantages of the present invention will become apparent by reference to the following description of the preferred embodiments and appended drawings.

DESCRIPTION OF THE PREFERRED EMBODIMENTS

Figure 1:
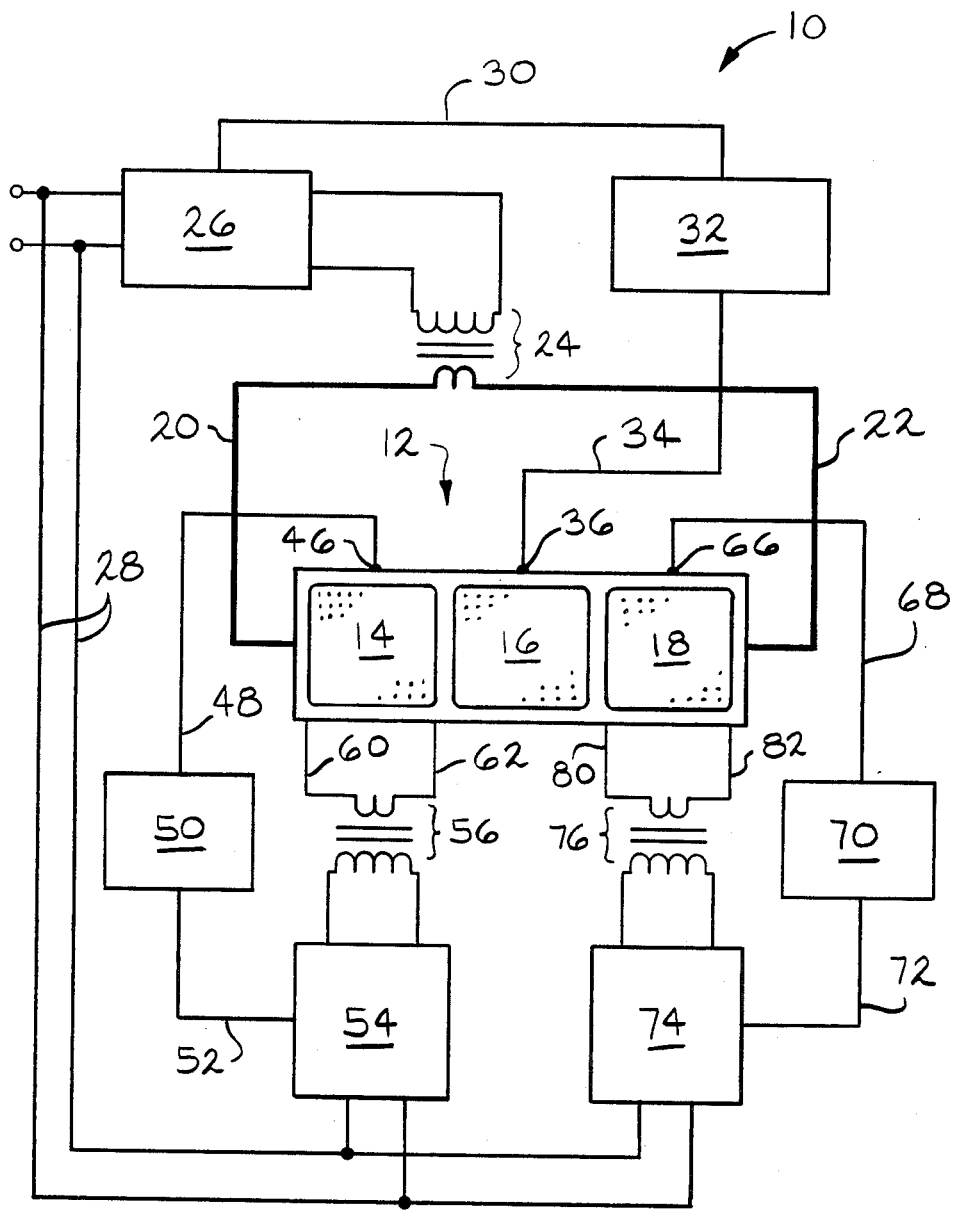
FIG. 1 is a diagrammatic view of a multiple section bushing controller according to the present invention utilizing thermocouples as temperature sensors.

Referring now to FIG. 1, a system for controlling and maintaining the temperature of a multiple section bushing through current injection and using thermocouples as temperature sensors is illustrated and generally designated by the reference numeral 10. The system 10 includes a mineral or glass fiber forming bushing assembly 12 which is segmented into three sections: a first or left section 14, a second or center section 16 and a third or right section 18. It should be understood that the description of the present invention in connection with a three section bushing is for purposes of example and illustration. The actual number of sections in a multiple section bushing which may be utilized with the present invention may readily and conveniently be more or fewer than the three sections herein described.

Electrical energy is supplied across the entire multiple section bushing assembly 12 through a pair of lines 20 and 22 which are connected to opposite ends of the multiple section bushing assembly 12 and which are coupled to the secondary of a first power transformer 24. The primary of the first power transformer 24 is supplied with electrical energy from a first power pack 26. The first power pack 26 is typically a solid state control device which is connected to a source of electrical energy in lines 28 and receives a control signal in a control line 30. The first power pack 26 adjusts the magnitude of its output to the first power transformer 24 in accordance with the control signal in the control line 30.

The control signal in the control line 30 is provided by a first process controller 32 which receives a voltage signal in a line 34 from a first thermocouple 36 secured to the center section 16 of the multiple section bushing assembly 12. The first process controller 32 may be like or similar to the Models 6810 or 6403 controllers manufactured by Electronic Control Systems of Fairmont, W. Va. or the Leeds and Northrup Emax V Controller. It will be appreciated that although the first thermocouple 36 senses only the temperature of the center section 16 of the multiple section bushing assembly 12, it provides data in the form of a voltage signal which ultimately controls the application of electrical energy to the entire bushing assembly 12. As such, the first power pack 26 may typically have a capacity of between approximately 10 and 35 kilowatts of electrical energy.

A second thermocouple 46 provides a signal in a line 48 to a second process controller 50 which is preferably identical to the first process controller 32 noted above. The output of the second process controller 50 is provided in a control line 52 to a second power pack 54. The second power pack 54 may be like or similar to the Electronic Control Systems model 7702 and preferably offers a current supply capability of about 30 amperes to the primary of a step down transformer which gives a secondary current of about 100 amperes. The second power pack 54 controls the supply of electrical energy from the lines 28 to the primary of a second power transformer 56. The output of the secondary of the second power transformer 56 is provided in lines 60 and 62 to opposite ends of the first section 14 of the multiple section bushing assembly 12.

A like assembly senses the temperature and provides control of electrical energy to the third section 18 of the multiple section bushing assembly 12. It includes a third thermocouple 66 which senses the temperature of the third bushing section 18 and provides a voltage signal in a line 68 to a third process controller 70. The third process controller 70 is preferably identical to the process controllers 32 and 50. The output of the third process controller 70 in a control line 72 is provided to a third power pack 74 which controls the supply of electrical energy to the primary of a third power transformer 76 which, in turn, supplies electrical energy from its secondary to opposite ends of the third bushing section 18 through a pair of lines 80 and 82. The third power pack 74 is preferably identical to the second power pack 54.

The just described components associated with the first bushing section 14 and those associated with the third bushing section 18 provide a closed loop control system which injects an appropriate current flow in to the respective bushing section in response to sensed temperature deviation from set point. The components described above (the first power pack 26, the first process controller 32, the thermocouple 36 and associated circuitry, on the other hand provide and control the flow of electrical energy across the entire multiple section bushing assembly 12.

Figure 2:
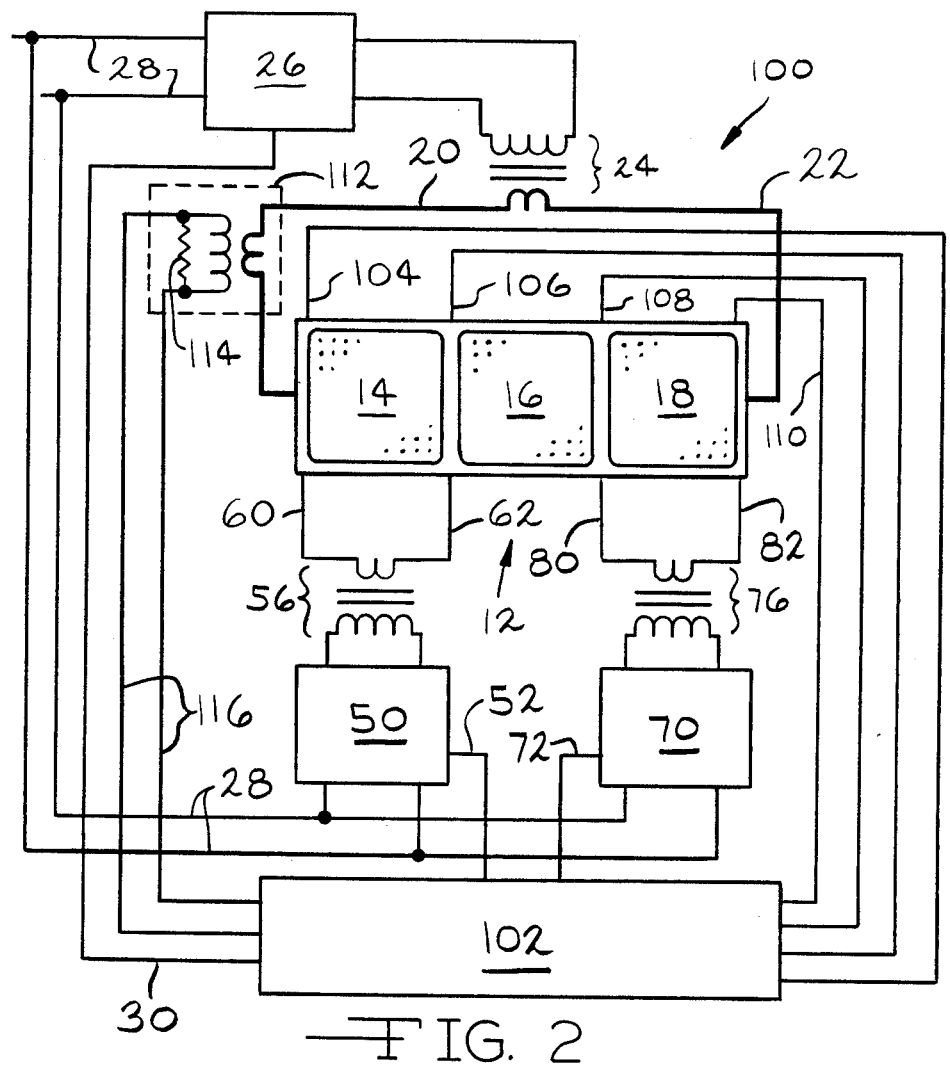
FIG. 2 is a diagrammatic view of a multiple section glass forming bushing controller utilizing resistance (voltage drop) temperature sensing techniques.
Figure 3:
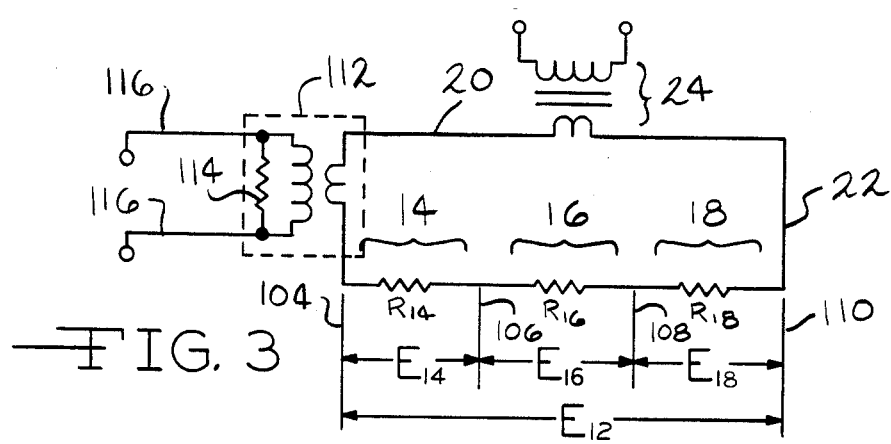
FIG. 3 is a diagram representing the electrical characteristics of a multiple section glass fiber forming bushing.
Figure 4:
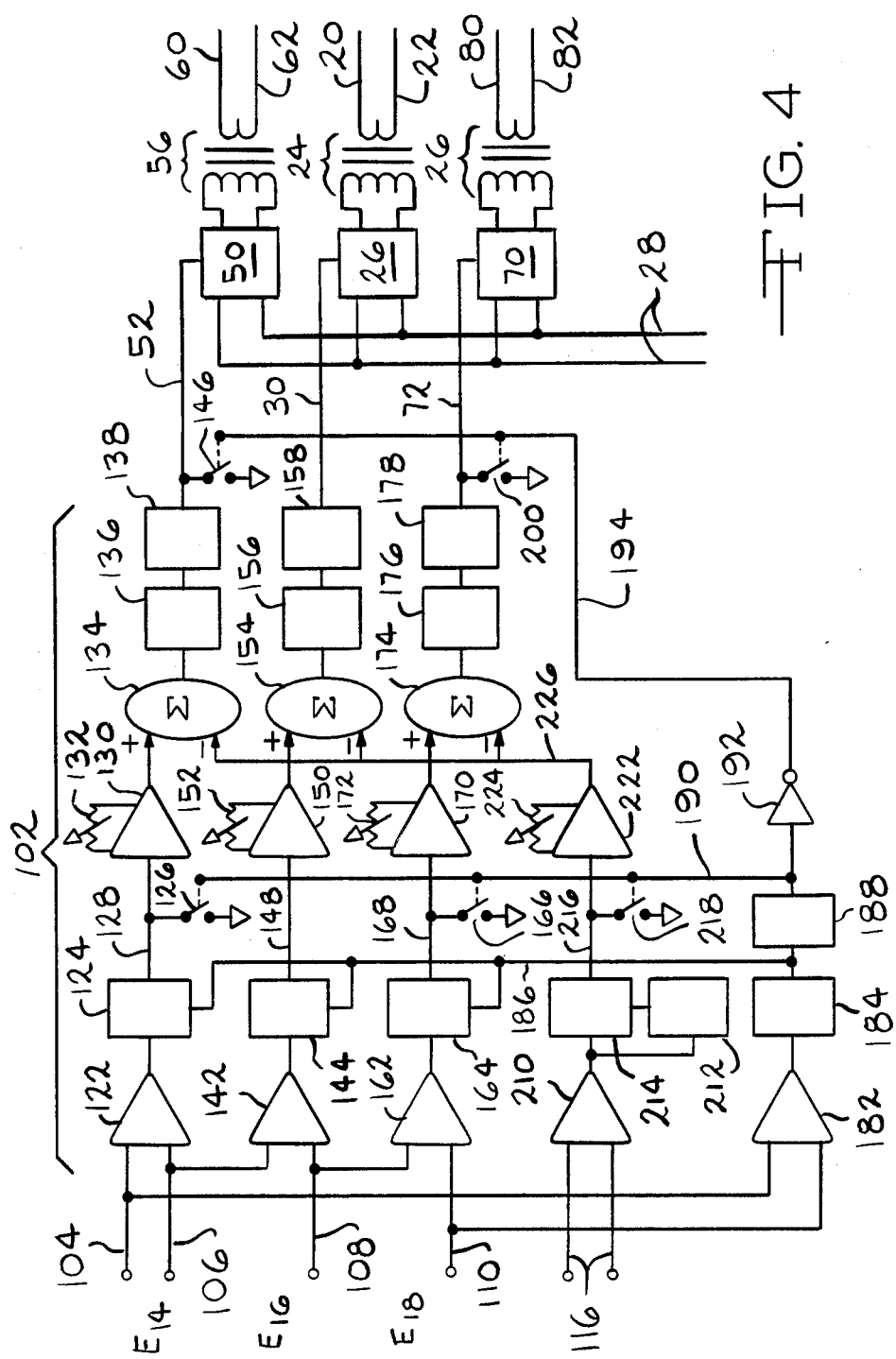
FIG. 4 is a schematic diagram of a controller for a multiple section glass fiber forming bushing utilizing resistance (voltage drop) temperature sensing techniques and interleaved sensing and current injection.

Referring now to FIGS. 2, 3 and 4, a second embodiment of a multiple section bushing temperature control system is illustrated and generally designated by the reference numeral 100. The multiple section bushing temperature control system 100 utilizes several of the same components, particularly electrical energy control components, as utilized in the first system 10 illustrated in FIG. 1 and, of course, operates in conjunction with an identical or similar bushing. The system 100 includes a mineral or glass fiber forming multiple section bushing assembly 12 which is divided into the three sections: a first or left section 14, a second or center section 16 and a third or right section 18. Once again, it should be understood that illustration and description of this embodiment of the present invention in connection with a three section bushing is merely exemplary and illustrative and that the invention may be utilized with multiple section bushings having more or fewer sections if desired. The system 100 also includes a pair of lines 20 and 22 which are connected to opposite ends of the multiple section bushing assembly 12 and provide electrical energy to it from the secondary of a first power transformer 24. The primary of the first power transformer 24 is supplied with electrical energy from a first power pack 26. The first power pack 26 controls the application of electrical energy in the lines 28 to the multiple section bushing assembly 12 in accordance with a control signal in a control line 30.

The system 100 likewise includes a second power pack 50 which receives a control signal in a second control line 52 as well as electrical energy in the lines 28 and controls the supply of electrical energy to the primary of a second power transformer 56. The secondary of the second power transformer 56 is coupled through a pair of lines 60 and 62 to opposite ends of the first bushing section 14. The system 100 likewise includes a third power pack 70 which is provided with a control signal in a third control line 72 and electrical energy in the lines 28 and controls the supply of electrical energy to the primary of a third power transformer 76. The secondary of the third power transformer 76 is coupled to opposite ends of the third bushing section 18 through a pair of lines 80 and 82.

The system 100 is distinct from the system 10 discussed above in the following ways. It further includes a bushing balance controller 102 which provides the control signals in the control lines 30, 52 and 72, to the first power pack 26, the second power pack 50 and the third power pack 70, respectively. The bushing balance controller 102 also receives four voltage signals in the lines 104, 106, 108 and 110. The difference between the voltages in the lines 104 and 106 represents the voltage drop across the first bushing section 14, the difference between the voltages in the lines 106 and 108 represents the voltage drop across the second or center bushing section 16 and the difference between the voltages in the lines 108 and 110 represents the voltage drop across the third bushing section 18. The system 100 also includes a current transformer 112 having its primary in either of the lines 20 or 22 associated with the main supply of electrical energy to the multiple section bushing assembly 12. The current transformer 112 senses the current flowing through the entire multiple section bushing assembly 12. The current signal induced in the secondary of the current transformer 112 is applied to a precision resistor 114 thereby producing a voltage signal in the control lines 116 which is supplied to the bushing balance controller 102.

FIG. 3 is an electrical diagram representing the electrical characteristics of a multiple section bushing such as the bushing assembly 12. Since a multiple section glass fiber forming bushing is electrically heated, relying on the resistance of the metal in the bushing to produce such heating, it can be represented by a series of resistors. $R_{14}$ represents the resistance of the first or left section 14 of the multiple section bushing assembly 12, $R_{16}$ represents the resistance of the second or center section 16 of the bushing assembly 12 and $R_{18}$ represents the resistance of the third or left section 18 of the bushing assembly 12. Each of these resistances changes as the temperature of the individual sections of the bushing changes.

In order to understand the operation of the bushing balance controller 102, a brief explanation of the theory of operation will now be presented.

The resistance/temperature relationships of materials, typically metals, used in glass fiber forming bushings can be represented by:

$$R_N = R_S[1 + \alpha(T_N - T_S)]$$

where:
$R_N$ = instantaneous resistance of section N of the bushing
$R_S$ = resistance of the Nth section of the bushing at the set point temperature $T_S$
$T_N$ = instantaneous temperature of section N of the bushing
$T_S$ = set point temperature
$\alpha$ = temperature coefficient of resistance of the bushing material.

In the present case of a triple section bushing assembly 12, the total resistance of the bushing $R_{12}$ can be represented by:

$$R_{12} = R_{14} + R_{16} + R_{18}$$

The current flowing in the bushing $I_{12}$ is the same in each section since they are connected in series. Since voltage, by Ohm's law, is resistance times current, the relationship becomes:

$$I_{12}R_{12} = I_{12}R_{14} + I_{12}R_{16} + I_{12}R_{18}$$

or $$E_{12} = E_{14} + E_{16} + E_{18}.$$

This is true, of course, when there is no current injection.

Thus the differences in potential between the lines and 106, 106 and 108, and 108 and 110 represent the voltage drops, respectively, across the first bushing section 14, the second bushing section 16 and the third bushing section 18 resulting from the current flow $I_{12}$ through the resistances R of the bushing sections. The voltage difference between the lines 104 and 110 represents the voltage drop across the entire multiple section bushing assembly 12.

As explained above, the resistance/temperature relationship of any bushing section N operating near set point temperature is given by:

$$R_N = R_S[1 + \alpha(T_N - T_S)]$$

The voltage drop $E_N$ across a bushing section N of a bushing B is the current times the resistance, that is, $$E_N = I_B R_N = I_B R_S[1 + \alpha(T_N - T_S)].$$

In order to control the temperature of a section of the bushing, a deviation signal $X_N$ is formed from the relationship:

$$X_N = CI_B - KE_N$$

where C and K are constants.

Substituting the penultimate equation into the previous equation yields:

$$X_N = CI_B - KI_B R_S[1 + \alpha(T_N - T_S)].$$

When the bushing section is at the proper, or set point temperature, $T_N = T_S$ and the deviation can be expressed as:

$$X_N = CI_B - KI_B R_S.$$

Since the deviation signal is zero at the set point temperature:

$$K = C/R_S.$$

However, when the temperature across a bushing segment does not equal the set point temperature:

$$T_N \neq T_S$$
$$T_N = T_S + \Delta T_N.$$

The equation becomes:

$$X_N = CI_B - KI_B R_S[1 + \alpha(T_S + \Delta T_N - T_S)].$$

Substituting $K = C/R_S$ into the previous equation yields:

$$X_N = KI_B R_S \alpha \Delta T_N.$$

Since K, $\alpha$, and $R_S$ are constants, this can be expressed as:

$$X_N = MI_B \Delta T_N$$

where M is a constant.

This deviation signal is linear over small ranges of $\Delta T$.

Referring again to FIGS. 2 and 3, and particularly to FIG. 4, the bushing balance controller 102 as well as the associated electrical components of the system 100 are illustrated. Inspection of the portion of FIG. 4 illustrating the bushing balance controller 102 reveals that there are three substantially identical circuit portions associated with the first, second and third bushing sections 14, 16 and 18 as well as certain additional circuitry. It will be understood that, as noted above, the bushing balance controller 102 may be utilized with a bushing of any number of sections and that the circuit portions may be utilized in greater or fewer numbers to correspond to the number of bushing sections.

The bushing balance controller 102 receives the voltage signals in the signal lines 104 and 106 which represent the voltages at each end of the first bushing section 14. The signals in the lines 104 and 106 are applied to a first differential amplifier 122. The differential amplifier 122 computes the difference between the two voltage signals and provides an output to a first synchronous demodulator 124. Likewise, the voltage signals in the lines 106 and 108, representing the voltages at each end of the second or middle bushing section 16, are provided to a second differential amplifier 142 and its output signal is provided to a second synchronous demodulator 144. The voltage signals in the lines 108 and 110 are provided to the input of a third differential amplifier 162 and its output is provided to a third synchronous demodulator 164. The synchronous demodulators 124, 144 and 164 precisely full wave rectify the alternating current signals provided to them.

The voltages at each end of the multiple section bushing assembly 12 appear in the lines 104 and 110 and are provided to a fourth differential amplifier 182. The output of the fourth differential amplifier 182 drives a zero crossing detector 184 which provides a basic control signal utilized in the bushing balance controller 102. The direct output from the zero crossing detector 184 is a train of pulses representing the nulls or zero crossings of the sine wave (A.C.) power provided to the multiple section bushing assembly 12. This train of pulses is provided to each of the synchronous demodulators 124, 144 and 164 in a line 186 and controls the rectification of the amplified voltage drop signals from the respective differential amplifiers 122, 142 and 162. The train of pulses is also provided to a divide-by-two circuit 188. The divide-by-two circuit 188 provides a pulse train in a control line 190 having one pulse for every two pulses in the line 186. The pulse train in the control line 190 drives a first pair of high speed, preferably electronic, switches 126 and 166 which intermittently shunt to ground the rectified output signals from the respective synchronous demodulators 124 and 164 in the lines 128 and 168. The pulse train in the line 190 is also provided to the input of an inverter 192. The output of the inverter 192 in a control line 194 is thus a series of pulses out of phase with the pulses in the control line 190. This out of phase series of pulses drives a second pair of high speed, preferably electronic, switches 196 and 200. The switches 196 and 200 intermittently shunt to ground the signals in the control lines 52 and 72, alternately enabling and disabling the control signals to the respective power packs 50 and 70. It will be appreciated that since the pulses in the control line 190 are inverted or out of phase with respect to the pulses in the control line 194 the closing and opening of the first pair of switches 126 and 166 alternates with or is out of phase with the closing and opening of the second pair of switches 196 and 200.

The voltage appearing in the lines 116 is, as noted, directly proportional to the bushing current. This voltage is amplified by a fourth differential amplifier 210. The output of the fourth differential amplifier 210 is fed to a second zero crossing detector 212 and also to a fourth synchronous demodulator 214. By utilizing a separate zero crossing detector for the current signal, any phase shift between the current signal and the voltage signal is eliminated. The output from the fourth synchronous demodulator 214 is carried in a line 216 coupled to a high speed switch 218 which shunts the output signal to ground when a pulse in the control line 190 is present.

Returning to the portions of the circuit relating to the voltage drop, the rectified (D.C.) signals in the lines 128, 148 and 168 are provided to a respective operational amplifier 130, 150 and 170. The operational amplifiers 130, 150 and 170 have feedback circuits 132, 152 and 172, respectively. The feedback circuits 132, 152 and 172 facilitate gain adjustment of the operational amplifiers 130, 150 and 170, respectively, as will be readily understood. The feedback circuits 132, 152 and 172 set the constants $\alpha$, $R_S$ and K. Since each circuit path has an individual feedback adjustment circuit, each can be tailored to specific individual operating characteristics.

The outputs of the operational amplifiers 130, 150 and 170 are fed, respectively, to one input of a like number of summing operational amplifiers 134, 154 and 174. The other inputs of the summing operational amplifiers 134, 154 and 174 are fed by an output signal from a fourth operational amplifier 222 having a feedback circuit 224. The feedback circuit 224 sets the gain which is the constant C. The output signal of the operational amplifier 224 represents the current in the bushing assembly 12 and is carried in a signal line 226 to the other input on each of the summing operational amplifiers 134, 154 and 174 as noted.

The output of the summing operational amplifier 134 is the deviation signal:

$$X_{14} = KI_B R_S \alpha \Delta T_{14}.$$

Similarly, the output of the summing operational amplifier 154 is the deviation signal:

$$X_{16} = KI_B R_S \alpha \Delta T_{16}$$

and the output of the summing operational amplifier 174 is the deviation signal:

$$X_{18} = KI_B R_S \alpha \Delta T_{18}.$$

The deviation signal from the summing operational amplifier 134 is then passed to a proportional and integral stage 136 which calculates the proportional and integral value of the positive error signal. This signal is then passed to a chopper 138 where the signal is conditioned for control of the second power pack 50. The portion of the bushing balance controller 102 associated with the second or middle bushing section 16 likewise includes a proportional and integral stage 156 which drives a chopper 158 which in turn drives the first power pack 26. The portion of the bushing balance controller 102 associated with the third or right bushing section 18 likewise includes a proportional and integral stage 176 which drives a chopper 178 which in turn drives the third power pack 70. The proportional and integral stages 136, 156 and 176 as well as the choppers 138, 158 and 178 may be combined into single units or their function may be provided by a typical commercial process controller such as the Model 6810 or ( Model 6403 manufactured by Electronic Control Systems or the Leeds and Northrup Model Emax V.

But for the obvious differences associated with the temperature sensing by thermocouples in the system 10 and temperature sensing by resistance (voltage drop) techniques in the system 100, the operation of the two systems 10 and 100 is substantially identical and will now be described. In both systems, the process controllers of N−1 bushing sections are adjusted to provide 50% power output in a manual, i.e. fixed, mode. This preliminary adjustment ensures that when set to automatic mode, the controllers will provide the maximum positive and negative temperature range of adjustment. Next, the primary power controller components (the first process controller 32 and associated power pack 26 in the system 10 and the components 142 through 158 of the bushing balance controller 102 and the power pack 26 of the system 100) are adjusted to obtain optimum and balanced throughput of the multiple section bushing assembly 12. This may be accomplished by any means including mechanical means such as fin adjustment and the like and provides a substantially equal throughput before the system is placed into automatic control mode. Next, the temperature set points of the N−1 controllers that is, those process components driving the second and third power packs 54 and 74, respectively, are adjusted to show zero error. At this time, the multiple section bushing assembly 12 is nominally in balance and the throughput and thus package size of the collected glass fibers will be substantially equal. Finally, the N−1 controllers are placed in the automatic mode and the systems 10 and 100 will operate to maintain the balanced condition.

It will be appreciated that the first or main power pack 26 provides a substantial portion of the electrical energy to the multiple section bushing assembly 12 as well as maintains the set point temperature of the second (Nth) section 16 of the multiple section bushing assembly 12. The second and third power packs 54 and 74 provide significantly smaller amounts of electrical energy to their respective bushing sections 14 and 18 and trim the temperature by injecting between 0 and 100% of their available electrical energy in accordance with the sensed temperature or resistance of the respective section of the multiple section bushing assembly 12.

With regard specifically to the system 100, and as noted previously, the current injected by the bushing balance controller 102 and specifically the second and third power packs 54 and 74 must not be present during the resistance (voltage drop) sensing. The high speed switches 126, 146, 166 and 200 which operate in alternation precludes such an occurrence which would result in thermal runaway of the bushing assembly 12 and eventual failure.

The foregoing drawings and description of the preferred embodiments is the best mode known to the inventors for practicing the present invention. It will be appreciated by those skilled in the art that modification and variations of such embodiments may be made and practiced. It, therefore, is intended that the foregoing description of this invention not be limited thereby but be limited only as set forth in the appended claims.

INDUSTRIAL APPLICABILITY

In the production of glass fibers it is desirable to produce a plurality of fibers of uniform diameter which result in uniform package size. The bushing balance control of the present invention facilitates control of a multiple section glass fiber forming bushing to produce uniform fiber diameters by balancing and maintaining the temperature across the plural sections of the bushing by current injection.

We claim:

1. An apparatus for controlling the temperature of each section of an N section glass fiber forming bushing, comprising, in combination, N means for sensing the temperature of each section of the N section bushing, N means for developing a respective temperature control signal for said each section of the N section bushing, N power supply means for supplying current to the N section bushing one of said N power supply means supplying current to all N sections of the N section bushing in response to one of said respective temperature control signals, and N−1 of said N power supply means supplying current to N−1 respective sections of the N section bushing in response to N−1 respective temperature control signals, where N is a positive integer greater than one.

2. The apparatus of claim 1 wherein said N temperature sensing means are thermocouples.

3. The apparatus of claim 1 wherein said N temperature sensing means includes means for measuring the voltage drop across said each section of the N section bushing.

4. The apparatus of claim 1 wherein said N temperature control signal developing means includes means for measuring the current supplied by said one of said N power supply means.

5. The apparatus of claim 1 further including means for disabling said N−1 of said N power supply means while said N−1 respective temperature sensing means is activated and for disabling said N−1 respective temperature sensing means while said N−1 of said N power supply means is activated.

6. The apparatus of claim 1 further including interleaving means for alternatingly and mutuallly exclusively activating and deactivating said N−1 respective temperature sensing means and said N−1 of said N power supply means.

7. An apparatus for maintaining a constant temperature in each section of a multiple section glass fiber forming bushing comprising:
(a) a glass fiber forming bushing compartmentalized into "N" individual section and constructed of a material which has a linear relationship between resistance and temperature characterized by the relationship $$R_N = R_S[+\alpha(T_N - T_S)]$$

where
N=1 to total number of bushing sections
$R_N$=instantaneous resistance of a given bushing section
$R_S$=resistance of the material at the set point temperature $T_S$
$\alpha$=resistivity change per degree Fahrenheit for the material used in the bushing
$T_N$=instantaneous temperature of a given bushing section
$T_S$=set point temperature of the section of the bushing (b) means to supply electrical current $I_B$ to said
(c) a current transformer to produce a signal proportional to the current $I_B$ flowing in said bushing;
(d) means to determine a voltage drop $E_N$ across each section of said bushing;
(e) means to determine an error signal $X_N$ for each section of said bushing having the value:

$$X_N = CI_B - KE_N$$

where C and K are constants, said error signal also equal to $$X_N = KI_B R_S \alpha \Delta T_N$$

where $\Delta T_N$=the difference between the instantaneous temperature $T_N$ of a given section of said bushing and the set point temperature $T_S$;

(f) means to inject current into N−1 of said bushing sections in response to said respective N−1 error signals;
(g) control means to regulate the supply of electrical current $I_B$ to the bushing in response to said Nth error signal; and
(h) means to disable measurement of the voltage drops and current when current is being injected, and means to disable current injection when the voltage drops and current are being measured.

8. An apparatus for balancing the temperature in each section of a multiple section glass fiber forming bushing comprising:
(a) means to determine a voltage drop across each section of a glass fiber forming bushing;
(b) means to determine a voltage drop across said bushing;
(c) means for calculating an error signal for each section of said glass fiber forming bushing based upon he voltage drop across the section and the current flowing in the section;
(d) means for injecting current into all but one of said sections in accordance with a respective all but one of said error signals; and
(e) means for supplying current to said bushing in accordance with the remaining error signal 9. The apparatus of claim 8 further including means for sensing the current supplied by said supplying means.

10. The apparatus of claim 8 further including means for disabling said current injecting means while said voltage drop determining means is activated and for disabling said temperature sensing means while said current injecting means is activated.

11. A method of balancing the temperature in each section of an N section glass fiber forming bushing, comprising the steps of:
measuring the temperature of each section of the N section bushing,
developing a respective temperature control signal for said each section of the N section bushing,
supplying current to all N sections of the N section bushing in response to one of said respective temperature control signals, and
supplying current to N−1 respective sections of the N section bushing in response to N−1 of said respective temeprature control signals,
where N is a positive integer greater than one.

12. The method of claim 11 wherein said temperature measuring step includes sensing the voltage drop across said each section of the N section bushing and developing an error signal representing the difference between the sensed temperature and a set point temperature.

13. The method of claim 11 wherein said temperature measuring step includes sensing the voltage drop across said each section of the N section bushing while inhibiting said supplying current to N−1 sections step and inhibiting said voltage drop sensing step while performing said just recited current supplying step.

14. The method of claim 11 wherein said temperature measuring step is performed by thermocouples.

* * * * *

UNITED STATES PATENT AND TRADEMARK OFFICE
CERTIFICATE OF CORRECTION

PATENT NO. : 4,780,120

DATED : October 25, 1988

INVENTOR(S) : Eugene C. Varrasso, et al.

It is certified that error appears in the above-identified patent and that said Letters Patent is hereby corrected as shown below:

At column 11, line 59, the word "bushing;" should be inserted after the word "said".

Signed and Sealed this

Twenty-first Day of March, 1989

Attest:

DONALD J. QUIGG

Attesting Officer

Commissioner of Patents and Trademarks